United States Patent [19]

Blaushild

[11] Patent Number: 4,711,760

[45] Date of Patent: Dec. 8, 1987

[54] NUCLEAR REACTOR INCORPORATING LOCKING DEVICE FOR THREADED BOLT CONNECTIONS

[75] Inventor: Ronald M. Blaushild, Penn Hills Township, Allegheny County, Pa.

[73] Assignee: Westinghouse Electric Corp., Pittsburgh, Pa.

[21] Appl. No.: 834,094

[22] Filed: Feb. 27, 1986

[51] Int. Cl.[4] .......................... G21C 1/01; F16B 37/04
[52] U.S. Cl. .................................... 376/399; 376/463; 411/108; 411/109; 411/113; 411/148; 411/374
[58] Field of Search ................ 376/399, 463; 411/103, 411/105, 107, 108, 109, 111, 113, 121, 148, 337, 371, 372, 373, 374

[56] References Cited

U.S. PATENT DOCUMENTS

| | | | |
|---|---|---|---|
| 2,636,533 | 4/1953 | Tinnerman | 411/107 |
| 2,782,827 | 2/1957 | Rosan | 411/108 |
| 2,867,258 | 1/1959 | Flora et al. | 411/113 |
| 4,043,239 | 8/1977 | DeFusco | 411/337 |
| 4,069,102 | 1/1978 | Berringer et al. | 376/463 |

Primary Examiner—David H. Brown
Assistant Examiner—Richard L. Klein
Attorney, Agent, or Firm—Daniel C. Abeles

[57] ABSTRACT

An improved nuclear reactor wherein the bolted connections between the baffle plates and baffle former and the baffle former and the core barrel are provided with a noval locking device that prevents loosening of the bolted connections. The locking device to prevent loosening of bolted connections where a threaded bolt is used to secure two components together uses a threaded lock nut over the bolt head, cooperative with a threaded wall in a recess in a component. The lock nut and wall of the recess have threads opposite the threads of the bolt. Deformable sections are formed in the base of the lock nut to engage an unsymmetrical cavity in the head of the bolt. Turning of the bolt in a direction that would tend to loosen the connection causes tightening of the lock nut. The wall of the lock nut may be threadedly engaged with the wall of the recess or the lock nut wall may have slits formed thereon which enable deformation of wall portions to engage the threaded wall of the recess.

19 Claims, 12 Drawing Figures

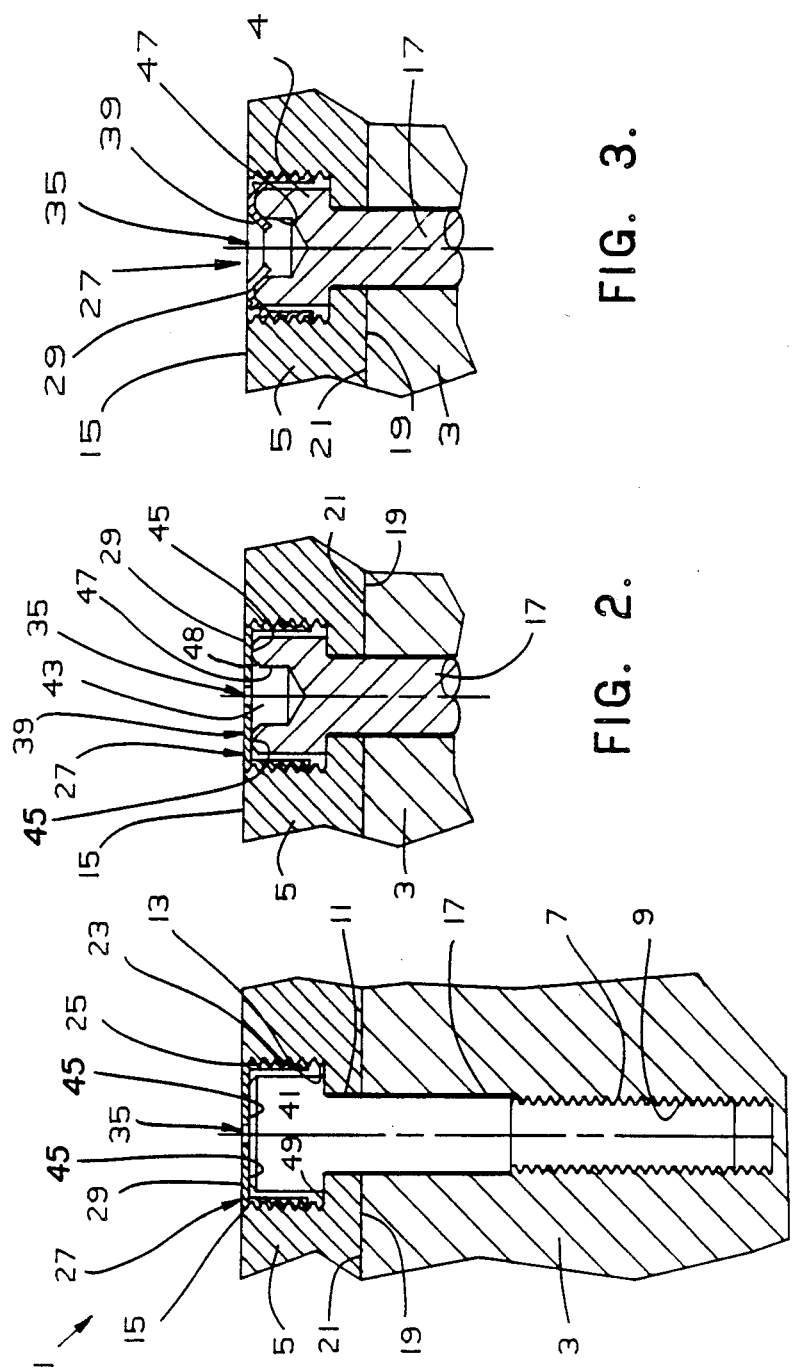

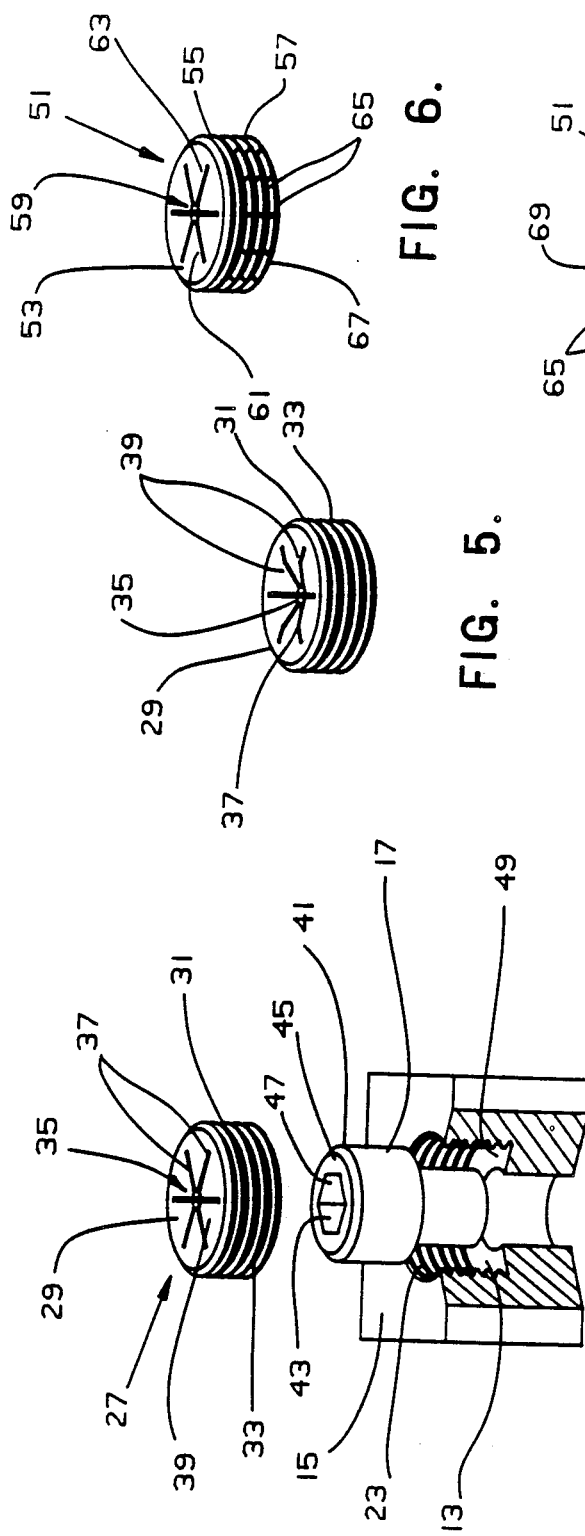

NUCLEAR REACTOR INCORPORATING LOCKING DEVICE FOR THREADED BOLT CONNECTIONS

FIELD OF THE INVENTION

The present invention relates to a nuclear reactor which incorporates a locking device that prevents loosening or separation, in the event of a bolt break, of a threaded bolt connection between two components, such as a baffle plate and a baffle former.

BACKGROUND OF THE INVENTION

A primary means of connecting two components together in a secure relationship is through the use of a threaded bolt. With threads provided in a bore of a first component, and an axially aligned bore through a second component, a threaded bolt is inserted through the bore of the second component and threadedly engaged with the threads of the bore in the first component, and by rotation of the bolt, the two components are pulled together and secured together.

Although such threaded bolt connections are extensively used, the initial securement of the two components together can be weakened in the case of vibratory or other stresses being applied to the threaded bolt connection which tend to cause the bolt to back out, even if ever so slightly, from its threaded securement. Also, under extreme stresses, a bolted connection may be severed by breakage of the bolt itself. While under normal conditions a plurality of such threaded bolt connections are used to secure two components together, such that breakage or fracturing of a single bolt will not cause separation of the components, in some instances, a bolt fragment may be separated from the remainder of the initial connection, which fragment may cause serious problems in the environment in which the two connected components are located.

In a nuclear reactor vessel environment, for example, where various components of a nuclear reactor, such as baffles, supports, or the like are secured together by threaded bolt connections, loosening or fragment dislocation can cause problems where a flow of coolant is continuously passed through the reactor. Such coolant passage could carry a bolt fragment to areas of possible damage to other reactor components. Numerous bolted connections are used in securing baffle plates to a baffle former and a baffle former to a core barrel of a nuclear reactor. Vibrations and coolant flow past the bolts can cause loosening of the bolted connections and possible fragmenting of the baffle bolts with the above-mentioned serious consequences. Such connections are, for example, described in detail in U.S. Pat. No. 4,609,102, assigned to the assignee of the present invention, and incorporated by reference herein.

As described in U.S. Pat. No. 4,069,102, the reactor internal structure for a nuclear reactor having a reactor vessel and means for circulating a liquid coolant through the vessel has a generally cylindrical core barrel supported in, and vertically oriented in, the reactor vessel, and a verticle core baffle disposed within the core barrel. The core barrel and core baffle are spaced to form an annulus between the barrel and baffle and a baffle former is disposed within the annulus. Bolted connections are used to secure the baffle former to the core barrel, and to secure baffle plates to the baffle former. The baffle plates, which are also described in U.S. Pat. No. 4,080,257, assigned to the assignee of the present invention, and incorporated by reference herein, are generally of stainless steel.

The present locking device provides a means for preventing loosening of a threaded bolt connection, and containment of fractured bolt sections within the initial location, without the need for welding. The device, due to its simplicity, is usable in applications where the connection is to be locked under submerged conditions, such as a liquid coolant, by remote controlled operation. The present device requires no special treatment, shaping or deformation of the base material and uses no springs which could wear or weaken over a period of time. The device also does not require any weakening of a bolt head such as by forming vertical or horizontal channels in the bolt head or other deformation thereof.

An improved nuclear reactor is provided through the use of the present threaded bolt connections, especially in baffle bolt connections, that provides for more secure and reliable connections of baffle plates to a baffle former, and the baffle former to the core barrel of a reactor vessel.

SUMMARY OF THE INVENTION

A locking device for preventing the loosening of bolted connections between two components where a threaded bolt is threadedly engaged with a threaded bore in the first component and passes through a bore in the second component to pull the components together. A threaded wall is formed in a recess in the second component which accepts the head of the bolt and a threaded lock nut is engageable with the threads in said wall and fits over the head of the bolt. The threads of the wall of the recess and the lock nut are opposite in direction to the threads of the bolt. Deformable sections are provided in the base of the lock nut, which has a downwardly depending peripheral cylindrical wall having the threads thereon, by a central aperture in the base and slots extending from the central aperture towards the cylindrical wall. Deformation of the deformable section downwardly engages the same with an unsymmetrical wall of a cavity in the head of the bolt to lock the same into position.

In another embodiment, slits are formed in the cylindrical wall of the lock nut such that the threads in the wall need not threadedly engage with the threaded wall of the recess for securement but, upon deformation of the deformable sections of the bore, the cylindrical wall sections between the slits will bow outwardly to engage the threaded wall of the bore in the second component.

An improved nuclear reactor incorporates the new locking device to connect various components thereof by bolted connections, such as baffle bolt connections using threaded bolts that secure baffle plates to a baffle former lining the reactor vessel, or the baffle former to the core barrel.

DESCRIPTION OF THE DRAWINGS

The present invention is further illustrated in the drawings, wherein:

FIG. 1 is a cross-sectional view of two components secured by a threaded bolt connection, with a locking nut of the present invention prior to deformation of deformable sections on the base of the lock nut, and the bolt shown in side elevation;

FIG. 2 is a cross-section similar to FIG. 1, with the bolt also shown in cross-section;

FIG. 3 is a cross-section of the locking device of the present invention with the deformable sections of the lock nut in engagement with the wall of the cavity in the bolt head, in locked position;

FIG. 4 is an exploded, perspective view of the locking device of the present invention better illustrating the components;

FIG. 5 is a perspective view of a lock nut usable in the present invention with the deformable sections downwardly deformed;

FIG. 6 is a perspective view of another embodiment of a lock nut usable in the present invention having a slitted, cylindrical wall;

FIG. 7 is a bottom plan view of the lock nut of FIG. 6;

DETAILED DESCRIPTION

Figure 8:
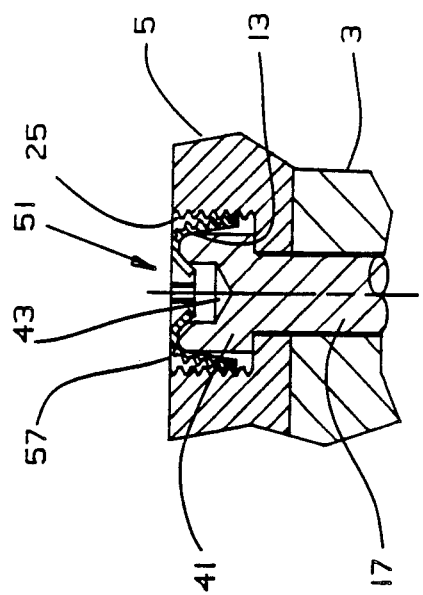
FIG. 8 is a cross-sectional view of a locked, bolted connection of two components after deformation of the deformable sections of the lock nut of FIG. 6.

The present locking device prevents the loosening of a threaded bolt connection between two components, such that upon exertion of stresses that would tend to cause the threaded bolt to back out of a threaded bore or upon breakage of the threaded bolt, which could cause separation of the components, a lock nut prevents such a backing or separation of broken bolt sections.

While the conventional securement of a bolt in a threaded bore is often suitable in maintaining two components connected to each other, problems sometimes arise where stresses or vibrations occur that cause the bolted connection to lose its initial secured position and loosen the connection. Also, at times, the bolt may be subjected to such severe stresses that a break in the bolt will occur that can cause loosening or separation of the two components, and disengagement of the head portion of the bolt from the bore.

In accordance with the present invention, a means is provided that, when used with a threaded bolt connection will prevent loosening of the bolt connection under adverse conditions that would cause loosening or separation of a conventional bolted connection. The present invention uses a lock nut of particular design, engageable with the bolt head, which has a threaded outer wall having a thread of an opposite direction to that of the direction of the thread of the bolt, such that upon turning of the bolt in a direction that would tend to loosen the two components, the lock nut is turned in a direction that actually tightens its relationship to the bolt head and retains the two components in a secure manner.

The bolt, as disclosed hereinafter may have a right-handed thread or a left-handed thread, provided that the lock nut, also hereinafter described, has an opposite thread. Thus, the thread of the bolt is in a first direction (right- or left-handed thread) and the thread of the lock nut is of a second or opposite direction (left- or right-handed thread) respectively. For the purpose of brevity, the device will be described wherein the bolt has a right-handed thread, and the lock nut a left-handed thread, although it is applicable also to bolts and lock nuts having oppositely directed threading.

Referring now to FIGS. 1 through 5, the locking device 1 of the present invention is illustrated wherein a first component 3 is secured to a second component 5. The first component 3 has a bore 7 therein having right-handed threads 9. The second component 5 has a bore 11 therethrough coaxial with the bore 7, and a recess 13 also coaxial therewith, extending inwardly from the outer surface 15 of the second component. A bolt 17 also having right-handed threads, as is conventional, is threadedly engaged with the threads 9 in the wall of the bore 7 in first component 3 to pull flush the lower surface 19 of the second component 5 and the upper surface 21 of the first component 3. Threads 23 are provided in the wall 25 of the recess 13 of the second component 5, which threads are left-handed threads, opposite the threads of the bolt 17.

The locking nut 27 comprises a base 29 and a downwardly depending skirt or cylindrical wall 31 (FIG. 4), with threads 33 in the outer surface of the wall engageable with the threads 23 of the wall 25 of the recess 13, which threads are also left-handed threads. The base 29 of this cup-shaped lock nut 27 has a central aperture 35 therethrough, and a plurality of radially outwardly extending slots 37 extending from the aperture 35 towards the downwardly depending cylindrical wall 31, but terminating spaced from said wall. The slots 37 form a plurality of deformable sections 39 therebetween in the base 29 of the lock nut 27.

The head 41 of the bolt 17 has a cavity 43 in the end surface 45 thereof which has an unsymmetrical wall 47 thereabout, preferably of a polygonal shape, the cavity illustrated in FIG. 4 having a hexagonal or six-sided wall 47. The end surface 45 of the head of the bolt may be downwardly and inwardly directed, as indicated at 48 in FIG. 2, from the outer edge thereof to the cavity 43. The head 41 of the bolt is of a first diameter, while the recess 13 is of a second diameter greater than the first diameter of the head of the bolt. This enables the head 41 of the bolt 17, when securely engaged in the threaded bore to engage a shoulder 49 formed by the recessed portion 13, while a gap is provided between the head 41 of the bolt and the threaded wall 25 of the recess 13, for placement of the lock nut.

The locking device is used by engaging the lock nut after the bolt has been inserted through the bore 11 of the second component and threadedly secured in the bore 7 of the first component. After the bolt 17 has been threadedly engaged in the right-handed threads 9 of the bore 7, with the head 41 of the bolt flush against shoulder 49 of the second component 5, the lock nut 27 is threadedly engaged with the threads 23 in wall 25 of the recess 13, with the undersurface 51 of the base 29 of lock nut 27 in contact, about at least its periphery, with the end surface 45 of the head 41 of the bolt 17 (FIG. 2). The deformable sections 39 of the base 29 are then deformed downwardly into the cavity 43 of the head of bolt 17 by impacting the inward ends of the deformable sections 39 adjacent the aperture 35, such as by a blunt punch or other suitable tool (FIG. 3). The position of the deformable sections, as deformed, is illustrated in FIG. 5. With the deformable sections 39 in contact with the unsymmetrical wall 47, about recess 43 in the head 41 of the bolt, any forces acting upon the bolt 47 to cause it to turn in a left-handed direction, which would tend to loosen the bolt from the right-handed threads of the bore will cause the lock nut to also attempt to rotate in a left-handed direction, and thus cause the lock nut to tighten within the left-handed threads of the wall of the recess. In an instance where the bolt experiences a break between portions of the bolt shaft, unless a prefectly clean, horizontal break occurs, a very unlikely possibility, the broken bolt section will still tend to cause rotation of the head of the bolt if loosening is to occur, such that tightening of the lock nut will again result.

Other embodiments of the lock nut, usable in the present locking device, are illustrated in FIGS. 6 through 8, wherein the lock nut need not be threaded into securement with the threads of the recess but rather deformation of the deformable sections causes such securement. As illustrated therein, the lock nut 51 has a base 53 and a downwardly depending cylindrical wall 55, with left-handed threads 57 on the outer surface thereof. A central aperture 59 is provided through the base 53, with radially outwardly extending slots 61 extending from the central aperture 59 towards the cylindrical wall 55 to form deformable sections 63. The downwardly depending cylindrical wall 55 has a plurality of vertical slits 65 therein, spaced about the cylindrical wall 55, extending from the terminus 67 towards the base 53. The diameter of the lock nut 51 will be slightly less than the second diameter of the recess 13 in the second component 5, but larger than the first diameter of the head 41 of the bolt, such that the cup-shaped lock nut 51 is insertable into the recess over the head 41 of the bolt 17, without the need to threadedly engage the threads 56 with threads 25 of the wall 23 of recess 13, with the undersurface 69 of the base 53 in contact with the head 41, over the unsymmetrical cavity 43. Deformation downwardly of the deformable sections 63 about the aperture 59 will cause the portions of the cylindrical wall 55 between spaced slits 65 to bow outwardly and engage with the threads 25 of the wall 23, as illustrated in FIG. 8.

Figure 9:
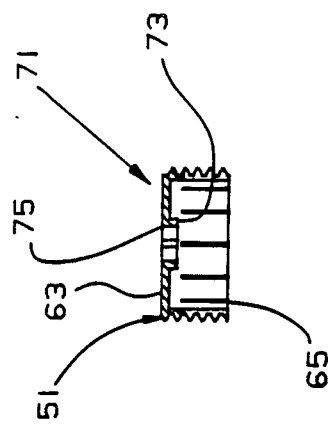
FIG. 9 is a cross-sectional view of a further embodiment of a lock nut, similar to that of FIG. 6, for use in the present invention.
Figure 10:
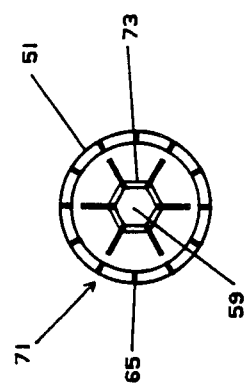
FIG. 10 is a bottom plan view of the lock nut of FIG. 9.

In a further embodiment of the lock nut 71, illustrated in FIGS. 9 and 10, a lock nut, such as illustrated as 51, is provided with downwardly depending legs 73 on the ends 75 of the deformable sections 63 to provide even better contact and engagement with the unsymmetrical wall 47 of the cavity 43 in the head of the bolt.

As described, the tendency of a bolt to loosen from a threaded securement will cause the lock nut to tighten and prevent such loosening. Also, upon breakage of a bolt, after threaded securement, any tendency of the bolt fragment to rotate, will be in the direction of loosening of the bolt and will also cause tightening of the lock nut and prevent such a fragment from separating or dislodgment from the bore in which the bolt is secured, and thus will retain the fragment within the bore.

The locking device is especially useful in securing baffle plates to a baffle former and a baffle former to a core barrel, or in other bolted connections in a pressurized water nuclear reactor. As is well-known, and described in the aforementioned U.S. Pat. Nos. 4,069,102 and 4,080,257, a nuclear reactor comprises a substantially cylindrical, vertically disposed tubular pressure vessel, the bottom of which is in the form of a hollow, hemispherical shell. A core barrel is disposed within the pressure vessel. Reactor control rod guide tubes are located within the upper region of the core barrel, while the reactor core internals, including the fuel element assemblies, the fuel element assemblies support grid structure and framework, and the like, are housed in the lower region of the core barrel.

The core barrel, or first element, has about its inner periphery, a baffle former structure that is covered with a plurality of baffle plates, or second element, that aid in channelling the flow of coolant through the core region and assembly thereof. The baffle former is secured to the inside surface of the core barrel and the baffle plates are then secured to the baffle former. Numerous connections, generally bolted connections are made to secure the baffle former to the core barrel and the baffle plates to the baffle former. The baffle bolts used for these connections are subject to loosening due to vibrations or other causes and means to prevent such loosening are highly desired.

Figure 11:
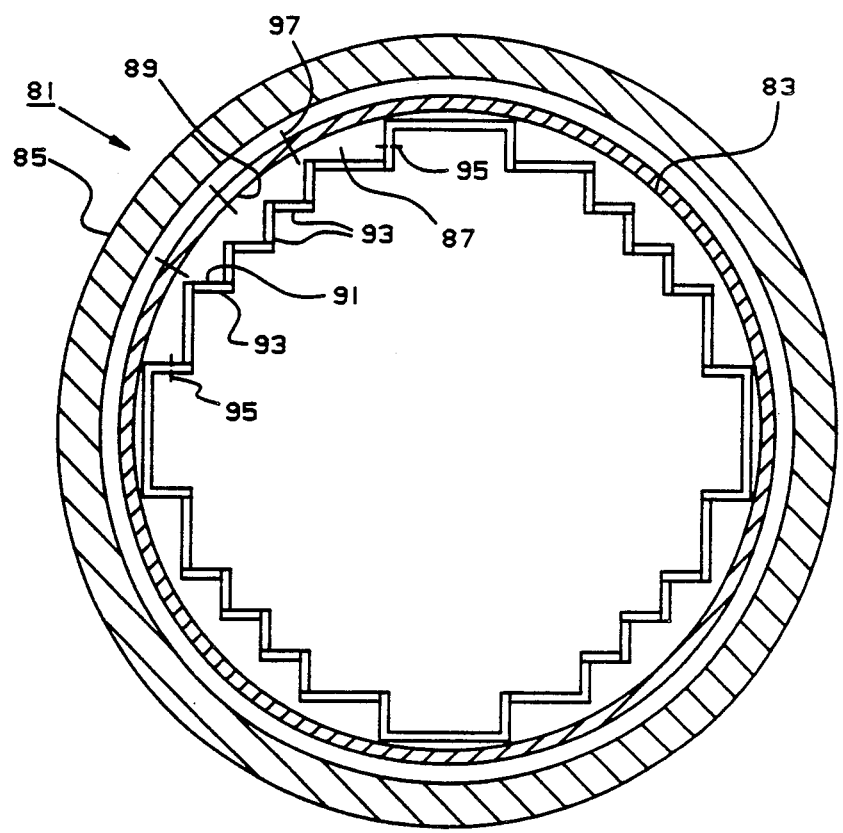
FIG. 11 illustrates a cross-sectional view of an improved reactor wherein the locking device is used to secure bolts holding the baffle former to the core barrel and/or bolts holding baffle plates to a baffle former.
Figure 12:
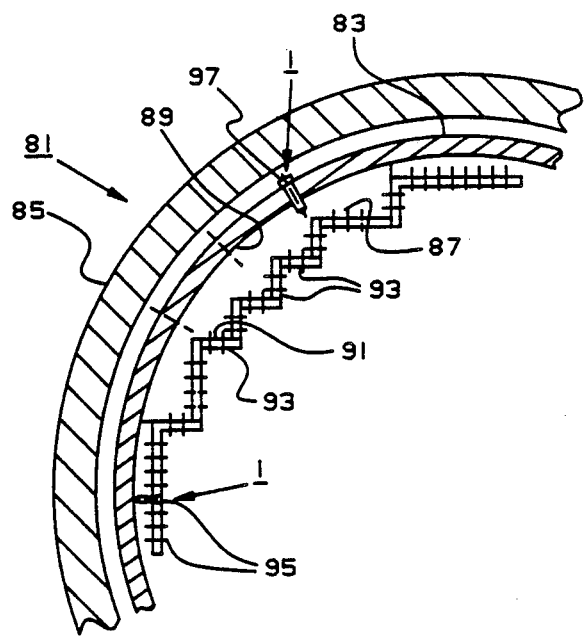
FIG. 12 is an enlarged section of FIG. 11 taken at the upper left-hand quadrant thereof.

Referring now to FIGS. 11 and 12, an improved nuclear reactor 81 contains a core barrel 83, positioned within a nuclear reactor pressure vessel 85, which core barrel has a baffle former 87 secured by bolted connections to the inner surface 89 thereof. The inner surface 91 of the baffle former 87 has a plurality of baffle plates 93 covering said inner surface, and secured thereto by bolted connections. Each baffle plate 93 secured to the baffle former 87 by a plurality of bolts 95, while the baffle former 87 is secured to the core barrel 83 by a plurality of bolts 97. Only a portion of the bolts and bolted connections are illustrated.

In the context of the fastening of two components together, the first component 3, as illustrated in FIGS. 1 through 4 and 10 would correspond to the first or second elements, the core barrel 83 or plurality of baffle plates 93, while the second component 5 would correspond to the baffle former 87.

By use of the locking means, the bolted connections between the core barrel 83 and the baffle former 87, or the bolted connections between the baffle plates 93 and the baffle former 87 are prevented from loosening, and if fragmenting of a bolt were to occur, the bolt fragment would still be retained by the locking means.

What is claimed is:

1. A nuclear reactor having a pressure vessel and a first element comprising a core barrel situated within the pressure vessel, the core barrel having a baffle former secured in and to said core barrel by bolted connections, and a second element comprising a plurality of baffle plates secured to the inner surface of said baffle former by bolted connections, with a locking device to prevent loosening of bolted connections between the baffle former and at least one of said elements, where the baffle former and said at least one element are held together by a headed, threaded bolt engaged in a bore coaxially extending in said baffle former and said at least one element and threadedly engaged in a threaded section in at least said baffle former, said threaded section having first threaded of a first direction, with the head of the bolt engaged with a shoulder about the bore in said at least one element to hold said baffle former and said at least one element together, the head of said bolt having a first diameter and a cavity, having an unsymmetrical wall thereabout, in the end surface thereof, comprising:

a recess in said at least one element coaxial with said bore forming a wall thereabout and extending inwardly from the outer surface of said at least one element, said recess having a second diameter greater than said first diameter, with said at least one element having second threads in said wall of a direction opposite the direction of the first threads of said threaded bore;

a locking nut having a base with a downwardly depending cylindrical wall thereabout, the outer surface of the cylindrical wall having threads engageable with the second threads on the wall of said recess and of the same direction thereof; the base having a central aperture therethrough and downwardly extendable projections on said base adjacent said aperture, such that said downwardly extendable projections, when the base of said lock nut is positioned flush with the end surface of said bolt, engage with the unsymmetrical walls of the cavity in the head of said bolt.

2. The nuclear reactor as defined in claim 1 wherein said at least one element comprises said core barrel.

3. The nuclear reactor as defined in claim 1 wherein said at least one element comprises said plurality of baffle plates.

4. The nuclear reactor as defined in claim 1 wherein both said first and second elements have said locking device to prevent loosening of bolted connections thereof with said baffle former.

5. The nuclear reactor as defined in claim 1 wherein radially outwardly extending slots are formed in said base extending outwardly from said central aperture towards, and terminating at a location spaced from, said cylindrical wall to form axially deformable sections in said base as said downwardly extending projections.

6. The nuclear reactor as defined in claim 5 wherein the threads on the outer surface of said cylindrical wall are threadedly engageable with the second threads in the wall of said recess in said at least one element.

7. The nuclear reactor as defined in claim 5 wherein said unsymmetrical wall about the cavity in the head of said bolt is of polygonal shape having a predetermined number of straight sides.

8. The nuclear reactor as defined in claim 7 wherein the base of said locking nut has an equal number of deformable sections as a number of straight sides of the unsymmetrical wall of said cavity.

9. The nuclear reactor as defined in claim 8 wherein the end surface of the head of said bolt is downwardly and inwardly directed from the outer edge thereof to said cavity.

10. The nuclear reactor as defined in claim 1 wherein a plurality of slits are formed in the downwardly depending cylindrical wall about the base of said locking nut extending from the terminus of said cylindrical wall towards said base.

11. The nuclear reactor as defined in claim 1 wherein said downwardly extending projections, adjacent said apertures, have downwardly depending legs thereon.

12. A locking device to prevent loosening of a bolted connection between first and second components where the two components are held together by a headed, threaded bolt engaged in a bore coaxially extending in said components and threadedly engaged in a threaded section in at least said first component, said threaded section having first threads of a first direction, with the head of the bolt engaged with a shoulder about the bore in the second said component to hold said components together, the head of said bolt having a first diameter and a cavity, having an unsymmetrical wall thereabout, in the end surface thereof, comprising:

a recess in said second component coaxial with said bore forming a wall thereabout and extending inwardly from the outer surface of said second component, said recess having a second diameter greater than said first diameter, with said second component having second threads in said wall of a direction opposite the direction of the first threads of said threaded bore;

a locking nut having a base with a downwardly depending cylindrical wall thereabout, the outer surface of the cylindrical wall having threads engageable with the second threads on the wall of said recess and of the same direction thereof; the base having a central aperture therethrough and downwardly extendable projections on said base adjacent said aperture, such that said downwardly extendable projections, when the base of said lock nut is positioned flush with the end surface of said bolt, engage with the unsymmetrical walls of the cavity in the head of said bolt.

13. The locking device as defined in claim 12 wherein radially outwardly extending slots are formed in said base extending outwardly from said central aperture towards, and terminating at a location spaced from, said cylindrical wall to form axially deformable sections in said base as said downwardly extending projections.

14. The locking device as defined in claim 13 wherein the threads on the outer surface of said cylindrical wall are threadedly engageable with the second threads in the wall of said recess.

15. The locking device as defined in claim 13 wherein said unsymmetrical wall about the cavity in the head of said bolt is of polygonal shape having a predetermined number of straight sides.

16. The locking device as defined in claim 15 wherein the base of said locking nut has an equal number of deformable sections as a number of straight sides of the unsymmetrical wall of said cavity.

17. The locking device as defined in claim 16 wherein the end surface of the head of said bolt is downwardly and inwardly directed from the outer edge thereof to said cavity.

18. The locking device as defined in claim 12 wherein a plurality of slits are formed in the downwardly depending cylindrical wall about the base of said locking nut extending from the terminus of said cylindrical wall towards said base.

19. The locking device as defined in claim 12 wherein said downwardly extending projections, adjacent said aperture, having downwardly depending legs thereon.

* * * * *